US006622140B1

(12) United States Patent
Kantrowitz (10) Patent No.: US 6,622,140 B1
(45) Date of Patent: Sep. 16, 2003

(54) METHOD AND APPARATUS FOR ANALYZING AFFECT AND EMOTION IN TEXT

(75) Inventor: Mark Kantrowitz, Pittsburgh, PA (US)

(73) Assignee: Justsystem Corporation, Tokushima (JP)

(*) Notice: Subject to any disclaimer, the term of this patent is extended or adjusted under 35 U.S.C. 154(b) by 334 days.

(21) Appl. No.: 09/713,726

(22) Filed: Nov. 15, 2000

(51) Int. Cl.$^7$ ............................................. G06F 17/30
(52) U.S. Cl. ................... 707/5; 707/1; 707/7; 707/100; 704/9; 715/531
(58) Field of Search .................... 707/1–10, 100–104.1, 707/500, 531; 704/1–10, 231, 251–257; 715/500.1, 531, 532

(56) References Cited

U.S. PATENT DOCUMENTS

| | | | |
|---|---|---|---|
| 4,041,617 A | 8/1977 | Hollander | 35/22 |
| 4,142,067 A | 2/1979 | Williamson | 179/1 |
| 4,931,934 A | 6/1990 | Snyder | 364/419 |
| 5,424,945 A | 6/1995 | Bell | 364/419.2 |
| 5,676,138 A | 10/1997 | Zawilinski | 128/630 |
| 5,768,580 A | 6/1998 | Wical | 395/613 |
| 5,819,238 A | 10/1998 | Fernholz | 705/36 |
| 5,860,064 A | * 1/1999 | Henton | 704/260 |
| 6,332,143 B1 | * 12/2001 | Chase | 707/100 |
| 6,418,435 B1 | * 7/2002 | Chase | 707/5 |

OTHER PUBLICATIONS

Chan, J.E., "The Generation of Affect in Synthesized Speech", Journal of the American Voice I/O Society, 8:1–19, Jul. 1990.
Collier, G., "Emotional Expression", Lawrence Erlbaum & Associates, Inc., 1985, Chapters 8 and 9, pp. 143–169.
Ortony, A., G.L., and Collins, A., "The Cognitive Structure of Emotions, Cambridge University Press", 1988, Introduction & Chapter 9, pp. 1–13 and 172–192.

* cited by examiner

Primary Examiner—Shahid Al Alam
Assistant Examiner—Joon Hwan Hwang
(74) Attorney, Agent, or Firm—Webb Ziesenheim Logsdon Orkin & Hanson, P.C.

(57) ABSTRACT

Disclosed is a computer-assisted method for classifying a text document according to emotion and affect. A score is assigned to each affect term in the document. An affect score is computed for the document from the scores for each affect term. The document is then classified in accordance with the affect score. An apparatus for performing the computer-assisted method is also disclosed.

20 Claims, 6 Drawing Sheets

METHOD AND APPARATUS FOR ANALYZING AFFECT AND EMOTION IN TEXT

BACKGROUND OF THE INVENTION

1. Field of the Invention

This invention relates to computer text documents and, more particularly, to analyzing affect and emotion in the documents.

2. Description of the Prior Art

There are methods and apparatuses that model emotion and personality, synthesize emotional speech, and monitor physical manifestations of emotion (including changes in brain signals, facial expression, and motion). However, there is no prior art that analyzes and measures emotion and affect in text documents.

G. Collier has analyzed emotional expression. Collier, *G., Emotional Expression*, Lawrence Erlbaum & Associates, In., 1985. Collier focuses on the use of grammatical categories, such as the ratio of the number of verbs and adjectives, the use of past tense and negation, and changes in grammatical complexity, to assess a speaker's emotional state. While Collier briefly discusses verbal immediacy, most of the work is on the use of adjectives to describe an emotional state. Almost all work at the intersection of emotion and text is focused on defining emotion words like "fear" and "surprise" and not on analyzing the emotional attitudes expressed in subtle fashion through text.

Text classification methods, like naïve Bayes, measure the probability of a word given that a document belongs to a class (positive, negative, or neutral). These methods do not consider the probability of a word's absence. Also, these methods cannot correctly assign affect to documents that contain a mixture of affect terms (i.e., contain positive and negative affect terms). Moreover, there have been no attempts in the text classification literature to analyze affect.

The naïve Bayes method computes the probability that a document merits a particular class label based on a simple combination of the independent probabilities for each of the words in the document. However, this method will not work well for affect analysis because the expression of emotion in text is more complex. The assumption of independent probabilities required by this method fails to properly account for the way in which positive and negative affects combine, and so will not be effective in classifying text documents according to affect.

Some prior art text classification methods count the frequency and rarity of affective terms. However, the likelihood that a document is positive is not well-correlated with just the presence of positive affect terms, but also with the absence of negative affect terms.

For example, applying known text classification methods to the task of finding positive web pages about Barney the purple dinosaur is ineffective. Most such pages were written by Barney-bashers in strong, negative tones. Presumably, somebody who hates Barney would want to see the negative pages, and somebody who loves Barney would want to see the positive pages. But a search for "love Barney purple dinosaur" would yield overwhelmingly negative pages, because the word "love" does not discriminate between positive and negative pages. Although the word "love" is one of the most common positive affect terms on the positive pages, it is also the most common positive affect term on the negative pages and appears more frequently on the negative pages than on the positive pages. Moreover, the word "love" appears 50% more frequently than the word "hate" on the negative pages. In fact, no positive affect term is effective at distinguishing positive Barney pages from negative pages. The most accurate method of distinguishing positive Barney pages from negative Barney pages is to look for Barney pages that include positive affect terms with a concurrent absence of negative affect terms.

None of the prior art concerns the classification of text documents according to affect. None of the prior art involves methods of analyzing affect in text, nor the identification of affect associated with each of the named entities mentioned in a text document. None of the prior art is capable of analyzing the subtle stylistic cues and influence that word choice applies to the emotional tone of a document.

SUMMARY OF THE INVENTION

In order to overcome the limitations of the prior art, I have developed a method and apparatus for analyzing affect and emotion in text documents.

Affect and emotion manifest themselves in text documents through subtle stylistic cues, such as changes in the choice of synonyms. For example, "John crushed the competition" and "John won" communicate the same information, but convey a different attitude about John's role.

The present invention analyzes affect and emotion in text, reporting a valence (positive, negative, or neutral) and intensity (magnitude) for the text's overall emotion and for the emotion associated with each named entity. The system can be used to classify news articles as good news or bad news, classify web pages on a topic as positive or negative, and classify customer communications into complaints and compliments. Other applications include the analysis of financial news for short-term prediction of the impact of the news on stock prices.

An embodiment of the present invention analyzes affect by computing a weighted sum of the scores for positive and negative affect terms (words and phrases), where the scores for negative affect terms are subtracted from the scores for positive affect terms. Possible scoring methods include the frequency of occurrence of an affect term or the frequency multiplied by a term intensity or magnitude (e.g., "maim" and "kill" are more strongly negative than "hurt"). Negation of an affect term can either be ignored or used to invert the contribution from the negated affect terms.

Most affect terms have only a single affect value. However, the affect assigned to some terms may depend on the term's part of speech. For example, the word "hit" is positive as a modifier ("hit movies"), negative as a noun ("took a direct hit"), and neutral ("hit a new 52-week high") or negative as a verb ("John hit Mary"). Thus, a part-of-speech tagger may be integrated with the affect analyzer. Likewise, the affect assigned to some terms may depend on the term's word sense. For example, the word "leading" has positive affect only when used to indicate prominence, not when used to refer to interline spacing.

Another embodiment of the present invention combines affect analysis with named entity extraction to assign an affect to each named entity mentioned in the document, in addition to assigning an affect value to the entire document. When assigning affect to named entities, the affect is assigned to the nearest named entity that is not "blocked" by other affect terms or named entities (terms between the affect term and the nearest named entity). The idea is that each mention of an affect term primes a positive or negative association in the reader's mind which may influence the reader's attitude to nearby named entities. But the affect decays rapidly, persisting only far enough to contribute to nearby named entities.

In a preferred embodiment, the direction of application of affect (e.g., before or after the named entity) is ignored. In another embodiment, the direction controls whether the affect is inverted for some affect terms. In another embodiment, the sentences are parsed and the affect from verbs is attached to the verb's agents and objects, as appropriate, and likewise from modifiers to modified objects. The intention is to capture the notion that the victim of a bad act is pitied and so gets positive affect. (But, in practice, it seems that proximity or involvement in a bad act tarnishes even the victim of the bad act.)

The ability to analyze emotion in text has many important applications. It can be used to classify news articles as good or bad, web pages as positive or negative, and customer communications (correspondence and telephone calls) as complaints or compliments. For example, a web search engine could be modified to allow the user to search for web pages that are positive or negative on a topic. It can also measure the magnitude of the emotion, allowing such documents to be prioritized according to intensity. It can be used to gauge user frustration with a user interface.

Another application of the present invention is to classify the links to a web page as positive or negative depending on the affect of the anchor text or text in the sentence or paragraph that contains the link. Since a link can be considered a vote by one web page for or against another web page, the affect associated with a link can help determine whether the target web page is considered to be a good or bad page. This information can be used to improve the quality of the search results on a web search engine. If one web page is regarded more positively than another by the sites that link to it, then it should be ranked higher.

Since news articles about companies may have an impact on investor confidence in a company, the attitudes expressed in an article about the company may have a subtle impact on stock prices. Combining an analysis of news article affect with historical price movements may facilitate the short-term prediction of the impact of a news article on stock prices because such an apparatus for analyzing affect could operate more quickly than people can read the articles. The ability to predict price swings in securities, even short-term, can be extremely lucrative.

DESCRIPTION OF THE PREFERRED EMBODIMENTS

Figure 1:
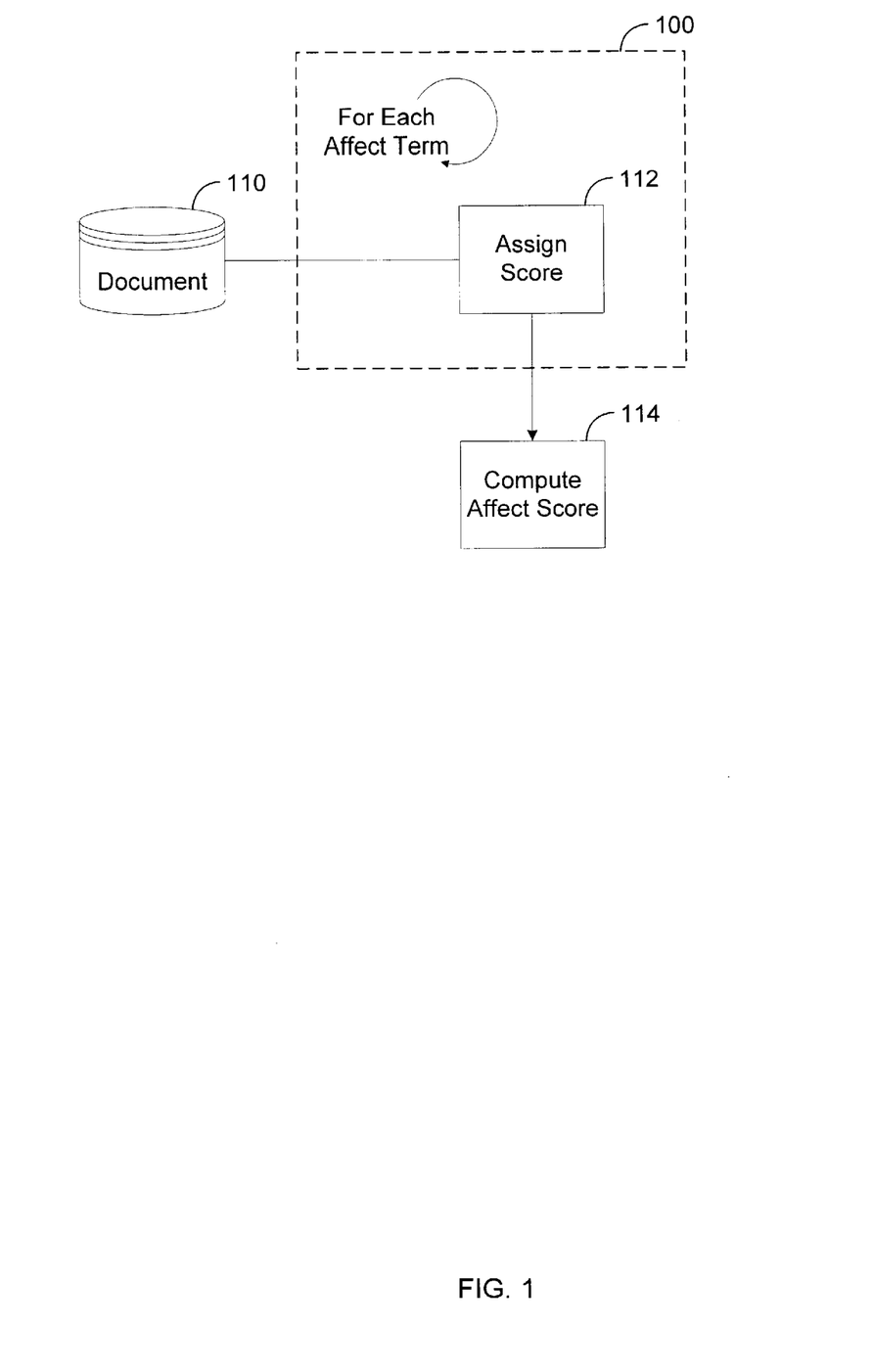
FIG. 1 is a flow diagram of a first embodiment of a method according to the present invention.

Referring to FIG. 1, a first embodiment of a method according to the present invention begins at loop 100. For each affect term in a document 110, step 112 assigns a score to the affect term. Affect terms may include one or more consecutive words. The score assigned to each affect term in step 112 may be the number of times each affect term appears in the document 110 or may be the number of times each affect term appears in the document 110 multiplied by an intensity value assigned to each affect term. An affect score for the document 110 is computed in step 114. The affect score may be reported in terms of valance (positive, negative, or neutral) and/or intensity (magnitude).

Figure 2:
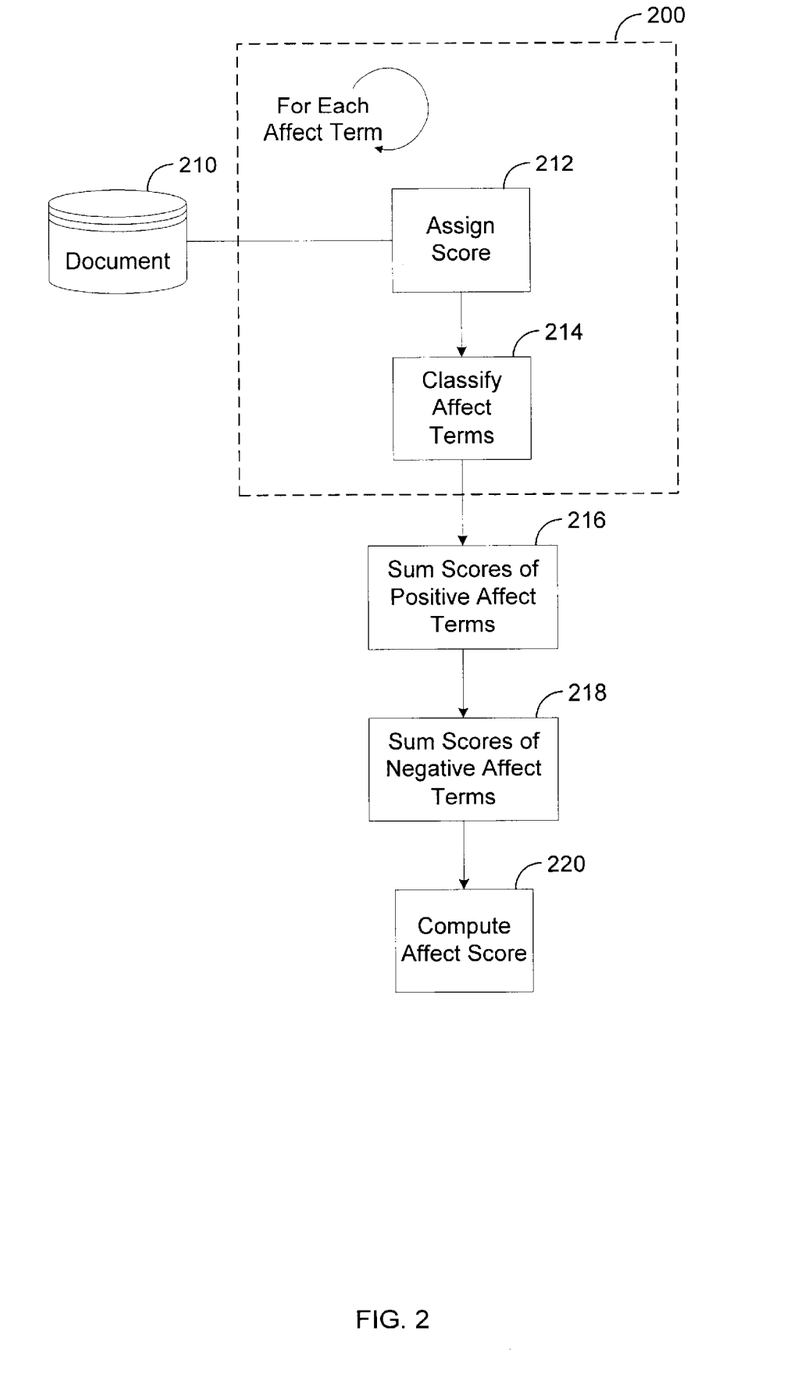
FIG. 2 is a flow diagram of a second embodiment of a method according to the present invention.

Referring to FIG. 2, a second embodiment of a method according to the present invention begins at loop 200. For each affect term in a document 210, step 212 assigns a score to the affect term. Step 214 classifies the affect term as either positive, negative, or neutral. The sum of the scores for all of the positive affect terms is calculated in step 216. Likewise, step 218 sums the scores of all of the negative affect scores. An affect score for the document 210 is computed in step 220.

If a negation term is used in conjunction with the affect term, the contribution from the affect term to the affect score may be inverted. In other words, if the affect term is positive, it may be treated as negative in the computation of the affect score, and vice versa. Thus, if a negative affect term is associated with a negation term, the score of the negative affect term may be summed with the positive affect terms. Likewise, if a positive affect term is associated with a negation term, the score of the positive affect term may be summed with the negative affect terms.

Classification of an affect term as positive or negative may happen at each occurrence of the term, instead of globally designating the term as positive or negative. The classification may be based on the part of speech of the term at that occurrence or the meaning of the term at that occurrence.

The affect score computed in step 220 may be a two part score, where the sum of the scores of the positive affect terms is one part and the sum of the scores of the negative affect terms is the other. The affect score may be computed as the sum of the negative affect term scores subtracted from the sum of the positive affect term scores.

Figure 3:
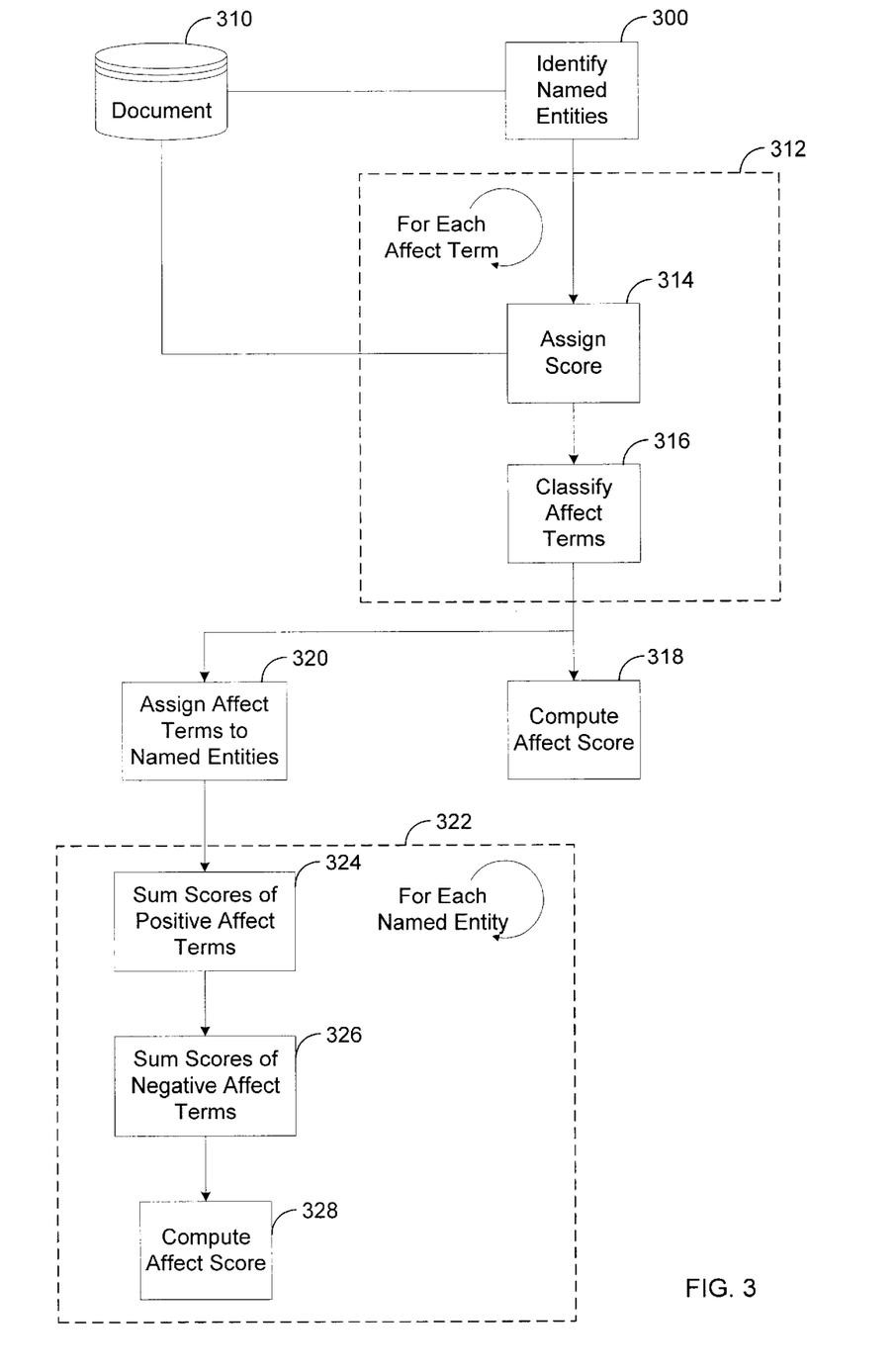
FIG. 3 is a flow diagram of a third embodiment of a method according to the present invention.

A third embodiment of a method in accordance with the present invention is illustrated in FIG. 3. Step 300 identifies the named entities contained in a document 310. Loop 312 iterates for each affect term in the document 310. Within loop 312, step 314 assigns a score to the affect term and step 316 classifies the affect term as either positive, negative, or neutral. An affect score for the document 310 is computed in step 318. Step 318 may be omitted. The affect terms are assigned to the named entities in step 320. Loop 322 iterates for each named entity in document 310. Within loop 322, step 324 sums the scores of the positive affect terms assigned to the named entity and step 326 sums the scores of the negative affect terms assigned to the named entity. An affect score for the named entity is computed in step 328.

Step 314 may further parse each sentence such that each verb's score is assigned to the verb's agent and objects and, likewise, each modifier's score is assigned to the modifier's objects.

In step 316, the classification of the affect term as positive or negative may be based on the direction from the affect term to the named entity.

The assignment of the affect term to a named entity in step 320 may be restricted such that it does not occur across sentence boundaries. In other words, for such an assignment to occur, the affect term and the named entity may be required to be contained in the same sentence.

The affect terms may be assigned to the named entities such for each affect term, the score is assigned to the named entity that is the closest to the affect term, or for each named entity, the score from the closest affect term is assigned to the named entity. In the latter case, if another named entity or affect term is between the named entity and the closest affect term, no assignment takes place (i.e., the other named entity or affect term "blocks" the assignment).

Figure 4A:
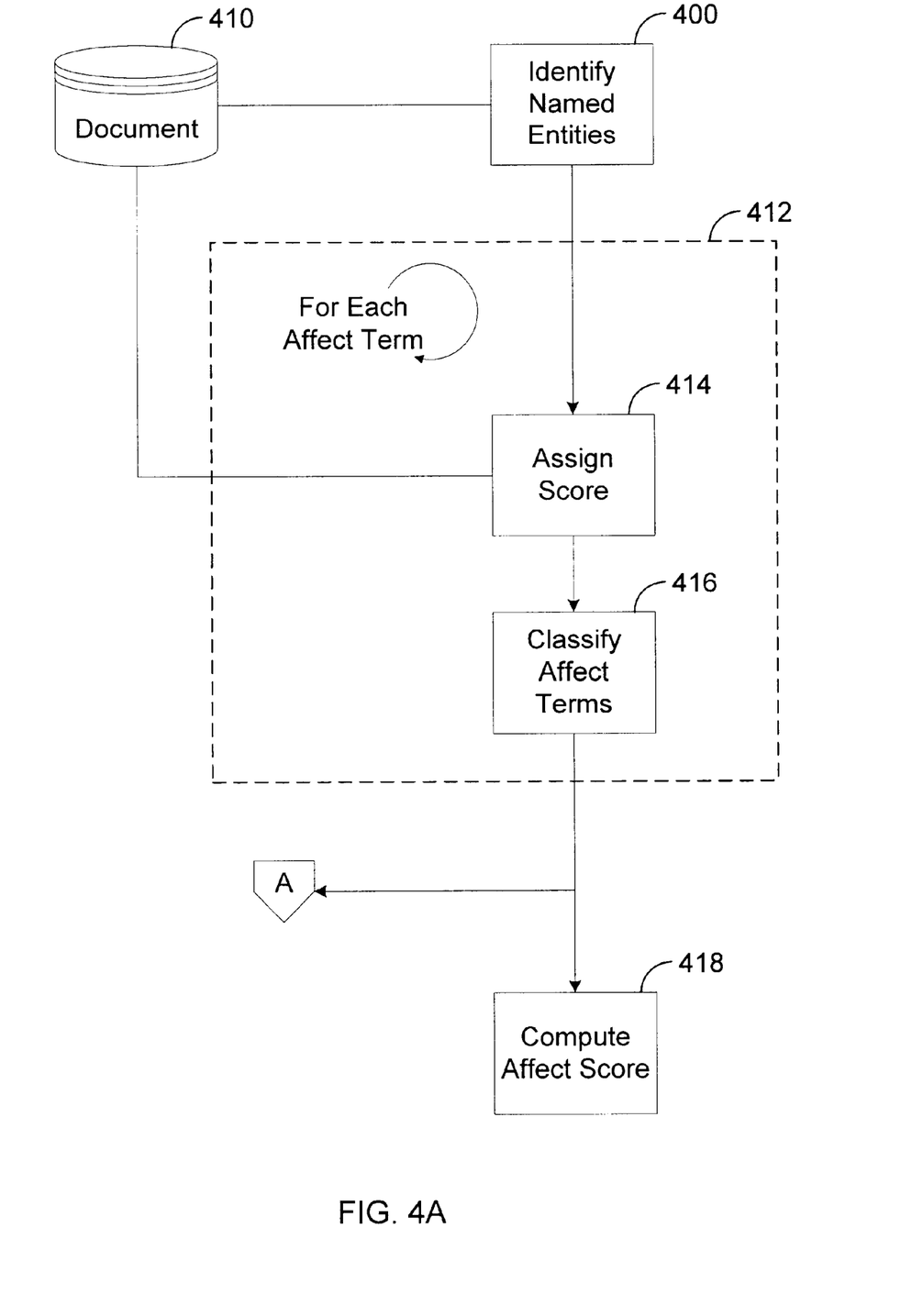
FIGS. 4A and 4B are a flow diagram of a fourth embodiment of a method according to the present invention.
Figure 4B:
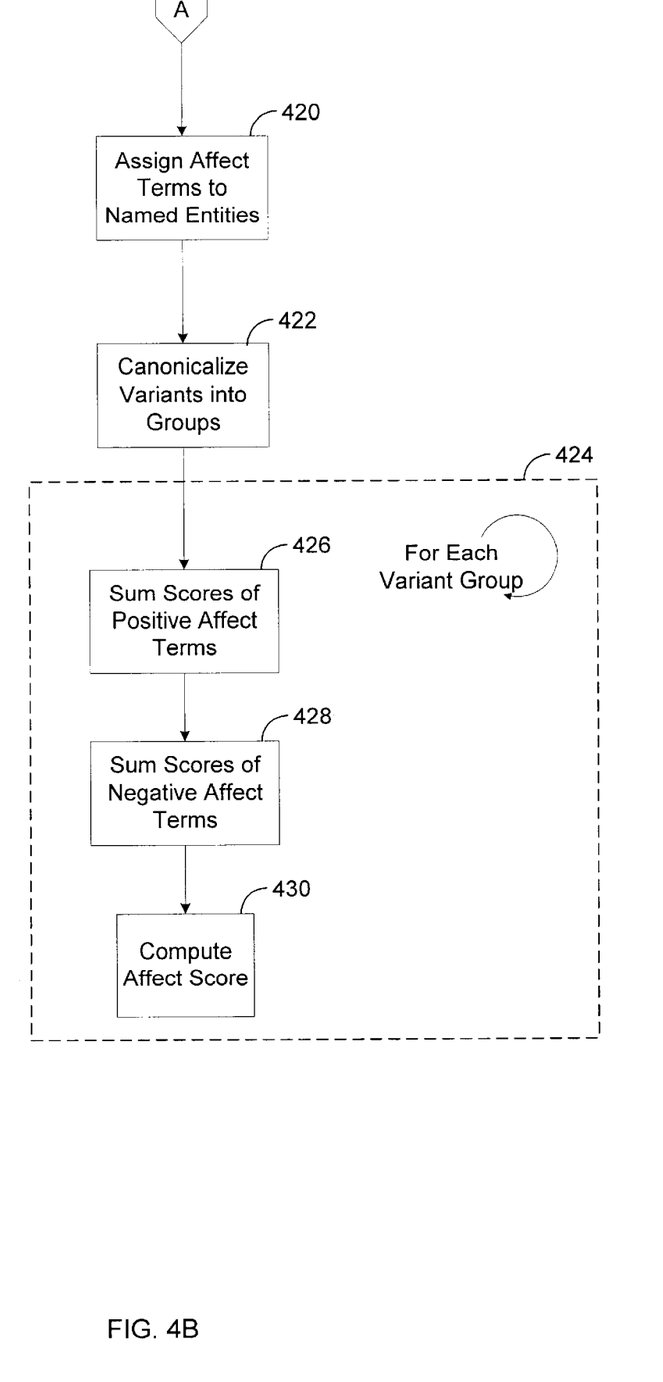

FIGS. 4A and 4B illustrate a fourth embodiment of a method according to the present invention. Referring to FIG. 4A, step 400 identifies the named entities contained in a document 410. Loop 412 iterates for each affect term in the document 410. Within loop 412, step 414 assigns a score to the affect term and step 416 classifies the affect term as either positive, negative, or neutral. An affect score for the document 410 is computed in step 418. Step 418 maybe omitted. Referring now to FIG. 4B, the affect terms are assigned to the named entities in step 420. The variants of the named entities are canonicalized into groups such that the variants may be treated as one entity instead of a multitude of entities. For example, "Compaq Computer Corporation", "Compaq Computer Corp.", "Compaq Computer", and "Compaq" are treated as the name for a single entity, not four different entities. Loop 424 iterates for each variant group. Within loop 424, step 426 sums the scores of the positive affect terms within the variant group and step 428 sums the scores of the negative affect terms within the variant score. An affect score for the variant group is computed in step 430.

The methods of the present invention may be applied to text documents, for example, to news articles, financial news articles, web pages, customer communications, and information retrieval tasks (e.g., document retrieval, filtering, routing, and classification).

News articles may be classified as good or bad. Furthermore, the named entities within the news articles may be classified as good or bad.

Financial news articles, likewise, may be classified as good or bad. The affect score may be used to predict price changes in securities associated with the named entities in a financial news article.

Web pages or other web documents may be classified as positive or negative. Furthermore, an information retrieval engine may search for web pages or documents that are positive or negative on a topic, in addition to the usual keywords. Search results may be prioritized according to the intensity of the affect score. The affect scores for the page and the named entities may be stored in an index for efficient computation of affect values at search time. Web pages may be classified as positive or negative according to the affect of the anchor text (sentence or paragraph) containing the link to the page (in all or some of the web pages that link to the page).

Customer communications, for example, correspondence, e-mail, and telephone calls, may be classified as complaints or compliments. E-mail may be classified as positive or negative according to the affect of the content and a simple glyph (e.g., a smiley or frowney face) or other visual indication (e.g., a red light or a green light) displayed in a summary view of the e-mail message.

Figure 5:
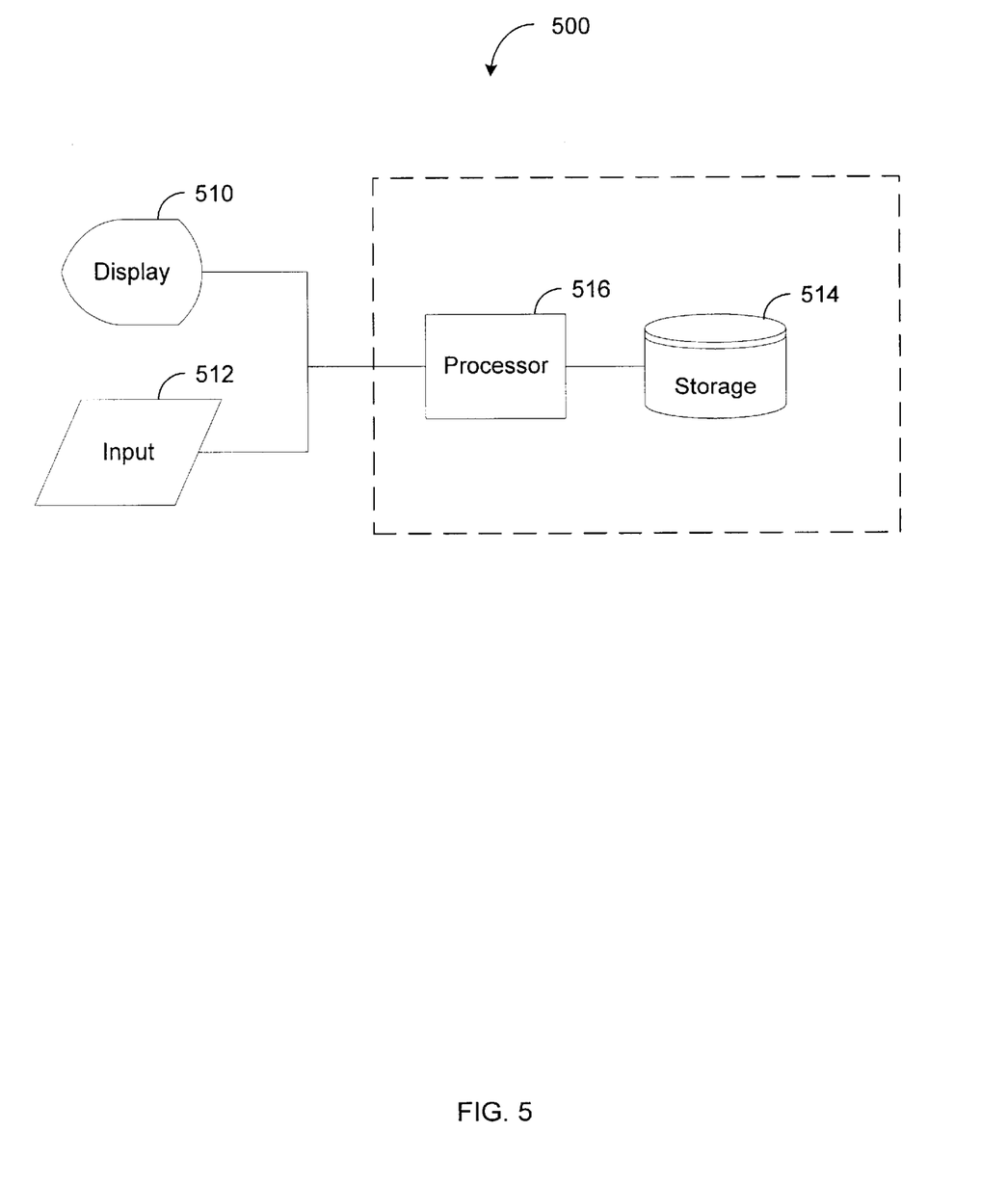
FIG. 5 is a schematic drawing of an apparatus according to the present invention.

FIG. 5 illustrates an apparatus capable of enabling the methods of the present invention. A computer system 500 is utilized to enable the method. The computer system 500 includes a display unit 510 and an input device 512. The input device 512 may be any device capable of receiving user input, for example, a keyboard or a scanner. The computer system 500 also includes a storage device 514 for storing the method according to the present invention and for storing the text to be changed. A processor 516 executes the method stored on the storage device 514. The processor is also capable of sending information to the display unit 510 and receiving information from the input device 512. Any type of computer system having a variety of software and hardware components which is capable of enabling the methods according to the present invention may be used, including, but not limited to, a desktop system, a laptop system, or any network system.

The following sets forth portions of computer code in the PERL language for implementing an embodiment of the present invention.

```perl
#! /usr/local/bin/perl
$lexicon = "affect.txt";
# This variable contains words that may appear within a company
# name in lowercase and so should be ignored for continuity
# purposes. Also numbers and punctuation.
@namestop = ("&","and","of","a","the","for","de","all","—","/",
"in","to","by","on","our","it","out","you","your");
# Since "May" and "June" can be real names, we need to be a bit more
# sophisticated than this, but this will do for now.
@casestop = ("monday","tuesday","wednesday","thursday","friday",
"saturday","sunday","mondays","tuesdays","wednesdays","thursdays",
"fridays","saturdays","sundays","january","february","march","april",
"may","june","july","august","september","october","november",
"december");
@stopwords = ("the","of","to","in","a","for","with","that","on","as",
"at","by","from","an","about","into","through","over","out","in","but",
"instead","there","nonetheless","no","why","because","he");
@eosstop = ("dr.","mr.","mrs.","ms.","u.s.");
# and, is, or, will,"be","its","are","more","said","has","our","any","than",
"All","have","which","their","it","was","this","new","one","also","can",
"other","been","they","we","but","were","such","taken","these","shall",
"may","your","who","some","you","would","had","he","those",
# "Inc.","most","not","many","just",Co.
# Table used to merge variant forms of a name.
%variants = ("International Business Machines","IBM",
"Compaq Computer","Compaq","Carnegie Mellon","CMU");
$canonicalizevariants = 1;
# Table used for detecting negation.
%negations = ("don't",1,"not",1,"no",1,"cannot",1,"can't",1,
"weren't",1,"wasn't",1,"didn't",1,"doesn't",1,"hasn't",1);
# If set to one, inverts the value of the affect phrase.
$negationinverts = 0;
# &negwordp($word)
# Load the lexicons
open(LEX,"$lexicon");
while (<LEX>) {
  chomp;
  ($phrase,$valence,$partofspeech,$direction,$intensity) = split(/:/,$_);
  $phrase =~ tr/A-Z/a-z/;
  if ($valence eq "+") {
    if ($intensity ne " ") {
      $pos{$phrase} += $intensity;
    } else {
      $pos{$phrase} ++;
    }
  } elsif ($valence eq "-") {
    if ($intensity ne " ") {
      $neg{$phrase} += $intensity;
    } else {
      $neg{$phrase} ++;
    }
  }
}
close(LEX);
# Parameters
$distancelimit = 10;
$debug = 0;
$ratio = 1;
$allnames = 0;
# Variables
$prev = " ";
$pprev = " ";
$ppprev = " ";
```

-continued

```
$pppprev = " ";
$ppppprev = " ";
$name = " ";
$nameoffset = 0;
$affect = " ";
$affectprev = " ";
$affectoffset = 0;
$lastname = " ";
$sawnamewordp = 0;
$nameuniquetotal = 0;
$nametotal = 0;
$lambda = 0.5;
$negtotal = 0;
$postotal = 0;
# Open the document file
while (<>) {
   # Remove the carriage return at the
   # end of the line.
   chomp;
   # Remove embedded HTML coding.
   s/\<.*\>//g;
   # Convert hyphens to spaces.
   # s/\-/ /g;
   # Split the line on whitespace to obtain the words.
   @words = split(/\s+/);
   # Iterate over the words in the line.
   foreach $word (@words) {
# Remove certain non-alphanumeric characters from
# the front and end of the word, as well as possessive
# markers. End-of-sentence punctuation is left on
# the word, to be removed later.
$word =~ s/^[\(\'\"]+//;
&word =~ s/[\)\'\"\,]+$//;
$word =~ s/\'s$//;
$saweos = 0;
# First look for names.
if ((&namewordp($word) &&
      !&namestopp($word) &&
      !&stopp($word) &&
      !&casestopp($word)) ||
      ($sawnamewordp &&
      &namestopp($word))) {
   $sawnamewordp = 1 if ($sawnamewordp == 0);
   if ($word =~ /[\.\!\?]$/ && !&eosstopp($word)) {
      $saweos = 1; $sawnamewordp = 0;
      $word =~ s/[\.\!\?]$//;
   } else {
      $saweos = 0;
   }
   if ($nameoffset == 0) {
      # Same name.
      if ($name eq " ") {
         $name = "$word";
      } else {
         $name .= "$word";
      }
   } else {
      # Different name. Reset the name and the affect.
      $nameoffset = 0;
      $name = "$word";
      $affect = " ";
      $affectprev = " ";
   }
   if (&namestopp($word)) {
      $lastname .= "$word";
   } else {
      $lastname = " ";
   }
} else {
   $sawnamewordp = 0;
}
if ((!$sawnamewordp || $saweos) && ($name ne " ")) {
   # Just completed the name by seeing the first non-name
   # word after the name. At this point we should check
   # for an affect phrase appearing before this name
   # but after any other names. If one is found, assign
   # its affect to the name.
   if ($nameoffset == 0) {
      if ($lastname ne " ") {
```

-continued

```
         $name =~ s/$lastname$//;
      }
      if ($canonicalizevariants) {
         $name = &canonicalize($name);
      }
      if ($sawname{$name} == 0) {
         $nameuniquetotal++;
         $sawname{$name}++;
      } else {
         $sawname {$name}++;
      }
      $nametotal++;
      print "$name\n" if ($debug);
      $sawnamewordp = 0;
      if ($affectoffset <= $distancelimit &&
         $affect ne " ") {
         if (&posp($affectprev,$affect) > 0) {
            $positive{$name}++;
            $paffect{$affect} = 1;
            print "[$affectprev] $affect +pre\n" if ($debug);
         }
         if (&negp($affectprev,$affect) > 0) {
            $negative{$name}++;
            $naffect{$affect} = 1;
            print "[$affectprev] $affect -pre\n" if ($debug);
         }
         $affect = " ";
         $affectprev = " ";
      }
}
# Start looking for an affect phrase appearing after the name.
# Use a window of up to five words, thereby allowing 1-grams
# through 5-grams for the affect phrases.
$word =~ tr/A-Z/a-z/;
if (&negp($prev,$word) > 0) {
   $negative{$name }++ if ($nameoffset <= $distancelimit);
   $affect = "$word";
   $affectprev = $prev;
   $negtotal++;
   print "[$affectprev] $affect -post\n" if ($debug);
   $naffect{$affect} = 1;
   $affectoffset = 0;
   $nameoffset = 0;
   $name = " ";
} elsif (&posp($prev,$word) > 0) {
   $positive{$name}++ if ($nameoffset <= $distancelimit);
   $affect = "$word";
   $affectprev = $prev;
   $postotal++;
   print "[$affectprev] $affect +post\n" if ($debug);
   $paffect{$affect} = 1;
   $affectoffset = 0;
   $nameoffset = 0;
   $name = " ";
} elsif (&negp($pprev,"$prev $word") > 0) {
   $negative {$name}++ if ($nameoffset <= $distancelimit);
   $affect = "$prev $word";
   $affectprev = $pprev;
   $negtotal++;
   print "[$affectprev] $affect -post\n" if ($debug);
   $naffect{$affect} = 1;
   $affectoffset = 0;
   $nameoffset = 0;
   $name = " ";
   } elsif (&posp($pprev,"$prev $word") > 0) {
   $positive{$name}++ if ($nameoffset <= $distancelimit);
   $affect = "$prev $word";
   $affectprev = $pprev;
   $postotal++;
   print "[$affectprev] $affect +post\n" if ($debug);
   $paffect {$affect} = 1;
   $affectoffset = 0;
   $nameoffset = 0;
   $name = " ";
   } elsif (&negp($ppprev,"$pprev $prev $word") > 0) {
   $negative{$name}++ if ($nameoffset <= $distancelimit);
   $affect = "$pprev $prev $word";
   $affectprev = $ppprev;
   $negtotal++;
```

```perl
        print "[$affectprev] $affect -post\n" if ($debug);
        $naffect{$affect} = 1;
        $affectoffset = 0;
        $nameoffset = 0;
        $name = " ";
            } elsif (&posp($ppprev,"$pprev $prev $word") > 0) {
        $positive{$name}++ if ($nameoffset <= $distancelimit);
        $affect = "$pprev $prev $word";
        $affectprev = $ppprev;
        $postotal++;
        print "[$affectprev] $affect +post\n" if ($debug);
        $paffect{$affect} = 1;
        $affectoffset = 0;
        $nameoffset = 0;
        $name = " ";
            } elsif (&negp($pppprev,"$ppprev $pprev $prev $word") > 0) {
        $negative{$name}++ if ($nameoffset <= $distancelimit);
        $affect = "$ppprev $pprev $prev $word";
        $affectprev = $pppprev;
        $negtotal++;
        print "[$affectprev] $affect -post\n" if ($debug);
        $naffect{$affect} = 1;
        $affectoffset = 0;
        $nameoffset = 0;
        $name = " ";
            } elsif (&posp($pppprev,"$ppprev $pprev $prev $word") > 0) {
        $positive{$name}++ if ($nameoffset <= $distancelimit);
        $affect = "$ppprev $pprev $prev $word";
        $affectprev = $pppprev;
        $postotal++;
        print "[$affectprev] $affect +post\n" if ($debug);
        $paffect {$affect} = 1;
        $affectoffset = 0;
        $nameoffset = 0;
        $name = " ";
            } elsif (&negp($ppppprev,
              "$pppprev $ppprev $pprev $prev $word") > 0) {
        $negative{$name}++ if ($nameoffset <= $distancelimit);
        $affect = "$pppprev $ppprev $pprev $prev $word";
        $affectprev = $ppppprev;
        $negtotal++;
        print "[$affectprev] $affect -post\n" if ($debug);
        $naffect{$affect} = 1;
        $affectoffset = 0;
        $nameoffset = 0;
        $name = " ";
            } elsif (&posp($ppppprev,
              "$pppprev $ppprev $pprev $prev $word") > 0) {
        $positive{$name}++ if ($nameoffset <= $distancelimit);
        $affect = "$pppprev $ppprev $pprev $prev $word";
        $affectprev = $ppppprev;
        $postotal++;
        print "[$affectprev] $affect +post\n" if ($debug);
        $paffect{$affect} = 1;
        $affectoffset = 0;
        $nameoffset = 0;
        $name = " ";
            } else {
        $nameoffset++ if ($name ne " ");
        $affectoffset++ if ($affect ne " ");
            }
              # AFFECT affectoffset NAME nameoffset AFFECT
        }
        $prev = $word;
        $pprev = $prev;
        $ppprev = $pprev;
        $pppprev = $ppprev;
        $ppppprev = $pppprev;
        }
}
print "NAMES (Distinct/Total): $nameuniquetotal/$nametotal\n";
printf "DOCUMENT AFFECT: %d (%d - %d)\n",
2*(($lambda * $postotal) - ((1 - $lambda) * $negtotal)),
$postotal, $negtotal;
print "\nNames:\n";
foreach $name (sort {&score($a) <=> &score($b)} keys(%sawname)) {
    if ($allnames || $sawname{$name} > 1) {
        printf" %.2f\t%s (%d - %d / %d)\n",&score($name),
        $name,$positive{$name},$negative{$name},$sawname{$name};
    }
}
if ($debug) {
    print "\nPositive Names:\n";
    foreach
    $name (sort {$positive{$b} <=> $positive{$a}} keys(%positive)) {
        printf" %4d\t%s\n",$positive{$name},$name;
    }
    print "\nNegative Names:\n";
    foreach
    $name (sort {$negative{$b} <=> $negative{$a}} keys(%negative)) {
        printf" %4d\t%s\n",$negative{$name},$name;
    }
}
print "\nPositive Affect Terms:";
$first = 0;
foreach $affect (sort {$a cmp $b} keys(%paffect)) {
    if ($first % 7 == 0) {
        print "\n\t$affect";
    } else {
        print ", $affect";
    }
    $first++;
}
if ($first = = 0) {
    print "\n\tNONE\n";
} else {
    print "\n";
}
print "\nNegative Affect Terms:";
$first = 0;
foreach $affect (sort {$a cmp $b} keys(%naffect)) {
    if ($first % 8 == 0) {
        print "\n\t$affect";
    } else {
        print ", $affect";
    }
    $first++;
}
if ($first == 0) {
    print "\n\tNONE\n";
} else {
    print "\n";
}
sub canonicalize {
    local($name) = @_;
    local($result);
    $result = $name;
    $result =~ s/ corporation//i;
    $result =~ s/ corp.//i;
    $result =~ s/ university//i;
    $result =~ s/ univ.//i;
    $result =~ s/ inc.//i;
    $result =~ s/ llc.//i;
    $result =~ s/ llc//i;
    $result =~ s/ l.l.c.//i;
    $result =~ s/ l.p.//i;
    $result =~ s/ lp.//i;
    $result = $variants{$result} if ($variants{$result} ne " ");
    if ($result ne " ") {
        return($result);
    } else {
        return($name);
    }
}
sub negwordp {
    local($word) = @_;
    if (($word/n\'t/i) || $negations{$word}) {
        return(1);
    } else {
        return(0);
    }
}
sub negp {
    local($prev,$phrase) = @_;
    local($result);
    if ($negationinverts && &negwordp($prev)) {
        $result = $pos{"$phrase"};
    } else {
```

-continued

```
        $result = $neg{"$phrase"};
    }
    return($result);
}
sub posp {
    local($prev,$phrase) = @_;
    local($result);
    if ($negationinverts && &negwordp($prev)) {
        $result = $neg{"$phrase"};
    } else {
        $result = $pos{"$phrase"};
    }
    return($result);
}
sub score {
    local($name) = @_;
    local ($result);
    $result = 2*(($lambda * $positive{$name}) -
        ((1 - $lambda) * $negative{$name}));
            if ($ratio) {
        return($result/$sawname{$name});
    } else {
        return($result);
    }
}
sub namestopp {
    local($word) = @_;
    local($result,$stop);
    $word =~ tr/A-Z/a-z/;
    $result = 0;
    foreach $stop (@namestop) {
        $result = 1 if ($stop eq $word);
    }
    return($result);
}
sub stopp {
    local($word) = @_;
    local($result,$stop);
    $word =~ tr/A-Z/a-z/;
    $result = 0;
    foreach $stop (@stopwords) {
        $result = 1 if ($stop eq $word);
    }
    return($result);
}
sub casestopp {
    local($word) = @_;
    local($result,$stop);
    $word =~ tr/A-Z/a-z/;
    $word =~ s/[\.\!\?]$//;
    $result = 0;
    foreach $stop (@casestop) {
        $result = 1 if ($stop eq $word);
    }
    return($result);
}
sub eosstopp {
    local($word) = @_;
    local($result,$stop);
    $word =~ tr/A-Z/a-z/;
    $result = 0;
    foreach $stop (@eosstop) {
        $result = 1 if ($stop eq $word);
    }
    $result = 1 if (length($word) == 2);
    return($result);
}
sub namewordp {
    local($word) = @_;
    local($fletter);
    $fletter = substr($word,0,1);
    return(&ucasep($fletter)); # || &digitp($fletter)
}
sub digitp {
    local($letter) = @_;
    local($ascii);
    $ascii = ord($letter);
    return(($ascii >= 48 && $ascii <= 57) || $ascii == 46);
}
```

-continued

```
sub lcasep {
    local($letter) = @_;
    local($ascii);
    $ascii = ord($letter);
    return($ascii >= 97 && $ascii <= 122);
}
sub ucasep {
    local($letter) = @_;
    local($ascii);
    $ascii = ord($letter);
    return($ascii >= 65 && $ascii <= 90);
}
```

The PERL implementation may be difficult to understand because it mixes heuristics for named-entity extraction and end-of-sentence detection with the analysis of affect. It also operates by maintaining state variables that can be modified by each successive word of the text. These state variables, in turn, may modify the operation of the affect analyzer. An implementation which extracted all of the named entities and affect terms from each of the document's sentences would be easier to understand and to flowchart, but not nearly as efficient as this finite state machine implementation. The rest of this section explains the details of the PERL implementation.

The process begins by loading an affect lexicon. Each entry in the lexicon consists of a phrase of up to five words, a positive or negative valence associated with the phrase, a part of speech constraint (noun, verb, and/or modifier), a direction, and an intensity. The intensity is intended to represent differences in term magnitude (e.g., "hate" is much more negative than "dislike") and defaults to 1. The following is an excerpt from an affect lexicon:

wrongdoings:−:N
wronged:−:V,M
wrongful-death:−:N
wrongful:−:M
wrongfully:−:M
wrongly:−:M
x-rated:−:M
x-rating:−:N
xenophobia:−:N
xenophobic:−:M
yearned:+:V
young:+:N,M
younger:+:M
youngest:+:M
youthful:+:M
yum:+:M
zen:+:M
zero:−:N,V
zippy:+:M
zombie:−:N
zombies:−:N Next it iterates over the words in the document, ignoring embedded HTML coding, if any. Parentheses, single and double quotation marks, and commas are removed from the words, as are possessive markers. End-of-sentence punctuation is left on the word, to be removed later.

First it checks whether the word is a name, using the following heuristics. These heuristics look for consecutive capitalized words, skipping over a small set of words like "of" that can appear in lowercase in the middle of a named entity's name.

the first letter of the current word is uppercase and is not a name stopword, regular stopword, or case stopword, or the previous word was a name (the $sawnamewordp flag is set) and the current word is a name stopword.

Name stopwords are words that frequently appear within a company or other entity name in lowercase and can be safely ignored for continuity purposes. For example, the word "of" in "United States of America" is a name stopword, as are the words "and", "of", "a", "the", "for", and so on. Case stopwords are words which normally appear with the first letter capitalized, but which are not names, such as days of the week and names of the month.

If the word is a name, it sets the $sawnamewordp flag, otherwise it unsets the flag. It also checks whether the word ends in end-of-sentence punctuation (period, exclamation point, or question mark). If so, and if the word is not an end-of-sentence stopword (a word like "Dr." or "Mr." which does not indicate the end of a sentence, or a word with embedded periods like "U.S."), it sets the $saweos flag and unsets the $sawnamewordp flag. The latter is because names do not cross sentence boundaries. It also removes the end-of-sentence punctuation at this point.

It then checks the value of $nameoffset, which is a count of the number of non-name words since the last name word. If $nameoffset is zero, it is still in the same name, and so appends the word to that name. Otherwise, it starts saving a new name. If it starts saving a new name, it resets the $affect variable, which contains the most recently seen affect phrase. This prevents the affect from crossing a name boundary, so that an affect term only modifies the named entities that are closest to it.

If the word is a name stopword, it saves it (plus any previous consecutive name stopwords) for possible later removal. This is because name stopwords may appear within a name, but not at the boundaries of the name—the name must begin and end with words of the appropriate case.

If $canonicalizevariants is set, it canonicalizes name variants so that "Compaq Computer Corporation", "Compaq Computer Corp.", "Compaq Computer" and "Compaq" are treated as the name for a single entity, not four different names.

Next, it begins checking for affect terms. If the $sawnamewordp flag is unset, it means the current word is not part of a name, and the $name variable, if non-null, contains a name. So until it starts seeing names again, it can check for affect phrases.

When it sees the first non-name word after a name ($nameoffset is zero), is should check for an affect phrase appearing before this name, but after any other names. Due to the nature of the state machine, the $affect variable will contain the affect phrase preceding the name and $affectoffset will be the number of non-affect, non-name words between the affect phrase and the name. If $affectoffset is less than the $distancelimit, it assigns the affect phrase's affect to the name by incrementing the name's positive or negative count. It also adds the affect phrase to a list of positive or negative affect terms found in the document. It also increments several counters associated with names: the number of times the name has been seen, the number of unique names seen in the document, and the total number of names that have been seen (allowing duplicates). It then resets $affect to the null-string, so that it can start building the affect phrases that appear after the name.

When looking for affect terms following a name, it uses a window of up to five words, with a preference for the shortest phrase. (It could easily change this to a preference for the longest phrase.) If the phrase is found in the affect lexicon, the corresponding affect is applied to the name. For example, if the phrase has negative affect, the negative affect count for the name is incremented, the total number of negative affect terms is incremented, and the phrase is added to a list of negative affect terms for the document. The phrase is saved to the $affect variable (for use with the name that follows the affect term) and $affectoffset and $nameoffset are set to zero. The $name variable is set to the null-string so that if another affect term is encountered before the next name, its affect will not apply to the previous name (i.e., the affect term inbetween blocks it). The $affect variable is still set to each successive affect phrase, so that the variable will hold the affect phrase closest to the name when the next name is encountered. If the window does not contain an affect phrase, the $nameoffset and $affectoffset variables are incremented.

The window is then shifted in preparation for the next word in the document.

After all words in the document are processed, the various counters contain all the information necessary to calculate the affect associated with the document and with the named entities contained within the document.

$nameuniquetotal and $nametotal contain the number of distinct names and the total number of names, $postotal is the total number of positive affect terms in the document, and $negtotal is the total number of negative affect terms. The overall document affect is calculated as a weighted difference of the two, where $postotal is multiplied by $lambda and $negtotal by (1−$lambda) before subtraction. $lambda is a weight between 0 and 1 that controls the relative influence of positive and negative affect terms. $lambda defaults to ½, the names that appear in the document are sorted by their affect scores. If the $allnames flag is unset, only names which appear more than once are reported. Affect scores are calculated in the same fashion as for the overall document affect, based on the positive and negative totals for the name. If $ratio is set, the affect scores for a name are normalized by the number of occurrences of the name in the document, and a list of all the negative and positive affect terms in the document are is printed.

It will be understood by those skilled in the art that while the foregoing description sets forth in detail preferred embodiments of the present invention, modifications, additions, and changes may be made thereto without departing from the spirit and scope of the invention. Having thus described my invention with the detail and particularity required by the Patent Laws, what is desired to be protected by Letters Patent is set forth in the following claims.

I claim:

1. A computer-assisted method for classifying a text document according to emotion and affect, comprising the steps of:

assigning a score to each affect term in the document, computing an affect score for the document from the scores for each affect term, classifying the document in accordance with the affect score, classifying affect terms as positive or negative, identifying named entities in the document, assigning the scores of the affect terms to the named entities, and for each named entity, summing the scores of all positive affect terms, summing the scores of all negative affect terms, and computing an affect score by subtracting the sum of the scores of all negative affect terms from the sum of the scores of all positive affect terms.

2. The computer-assisted method according to claim 1, wherein the affect terms include one or more consecutive words.

3. The computer-assisted method according to claim 1, wherein the score assigned to each affect term is assigned by counting the number of times each affect term occurs within the document and assigning the number of times the term occurs as the score.

4. The computer-assisted method according to claim 1, wherein the score assigned to each affect term is assigned by:

assigning an intensity value for each term, and counting the number of times each affect term occurs within the document, wherein the score assigned to each affect term is the number of times the term occurs multiplied by the intensity value for the terms as the score.

5. The computer-assisted method according to claim 1, wherein if a negation term is used in conjunction with the affect term, the positive affect term is treated as a negative affect term, and vice versa.

6. The computer-assisted method according to claim 1, wherein each affect term is classified as positive or negative at each occurrence of the term based on the part of speech of the affect term at the occurrence.

7. The computer-assisted method according to claim 1, wherein each affect term is classified as positive or negative at each occurrence of the affect term based on the meaning of the affect term at the occurrence.

8. The computer-assisted method according to claim 1, wherein the affect score is the sum of the scores of all positive affect terms and the sum of the scores of all negative affect terms.

9. The computer-assisted method according to claim 1, wherein the score assigned to each affect term is assigned by additionally parsing sentences of the document such that each verb's score is assigned to the verb's agent and objects and each modifier's score is assigned to the modifier's objects.

10. The computer-assisted method according to claim 1, wherein the classification of the affect term as positive or negative is based on the direction from the affect term to the named entity.

11. The computer-assisted method according to claim 1, wherein the assignment of the affect term score to the named entity occurs when the affect term and the named entity are in the same sentence.

12. The computer-assisted method according to claim 1, wherein the scores from the affect terms are assigned to the named entities by, for each affect term, assigning the score from the affect term to the closest named entity.

13. The computer-assisted method according to claim 1, wherein the scores from the affect terms are assigned to the named entities by, for each named entity, assigning the score from the closest affect term to the named entity.

14. The computer-assisted method according to claim 1, wherein the assignment occurs when no other named entity is between the named entity and the closest affect term.

15. The computer-assisted method according to claim 1, further comprising the step of:

canonicalizing variants of the named entities into groups of synonymous variants to be treated as a single named entity.

16. The computer-assisted method according to claim 1, wherein the text document is a news article.

17. The computer-assisted method according to claim 16, wherein the news article is a financial news article.

18. The computer-assisted method according to claim 1, wherein the text document is a web page.

19. The computer-assisted method according to claim 1, wherein the text document is customer communications.

20. An apparatus to enable a method for classifying a text document according to emotion and affect, comprising:

means for assigning a score to each affect term in the document, means for computing an affect score for the document from the scores for each affect term, means for classifying the document in accordance with the affect score, means for classifying the affect terms as positive or negative, means for identifying named entities in the document, means for assigning the scores of the affect terms to the named entities, and for each named entity, means for summing the scores of all positive affect terms, means for summing the scores of all negative affect terms, and means for computing an affect score by subtracting the sum of the scores of all negative affect terms from the sum of the scores of all positive affect terms.

* * * * *

UNITED STATES PATENT AND TRADEMARK OFFICE
CERTIFICATE OF CORRECTION

PATENT NO. : 6,622,140 B1
DATED : September 16, 2003
INVENTOR(S) : Mark Kantrowitz It is certified that error appears in the above-identified patent and that said Letters Patent is hereby corrected as shown below:

<u>Column 5,</u>
Line 14, "maybe" should read -- may be --.

<u>Column 16,</u>
Line 11, "claim 1" should read -- claim 13 --.

Signed and Sealed this

Second Day of March, 2004

JON W. DUDAS
*Acting Director of the United States Patent and Trademark Office*